Nov. 11, 1952 W. COPP 2,617,453
JIG SAW

Filed May 19, 1949 3 Sheets-Sheet 1

INVENTOR
WILLIAM COPP.
By
ATTORNEY

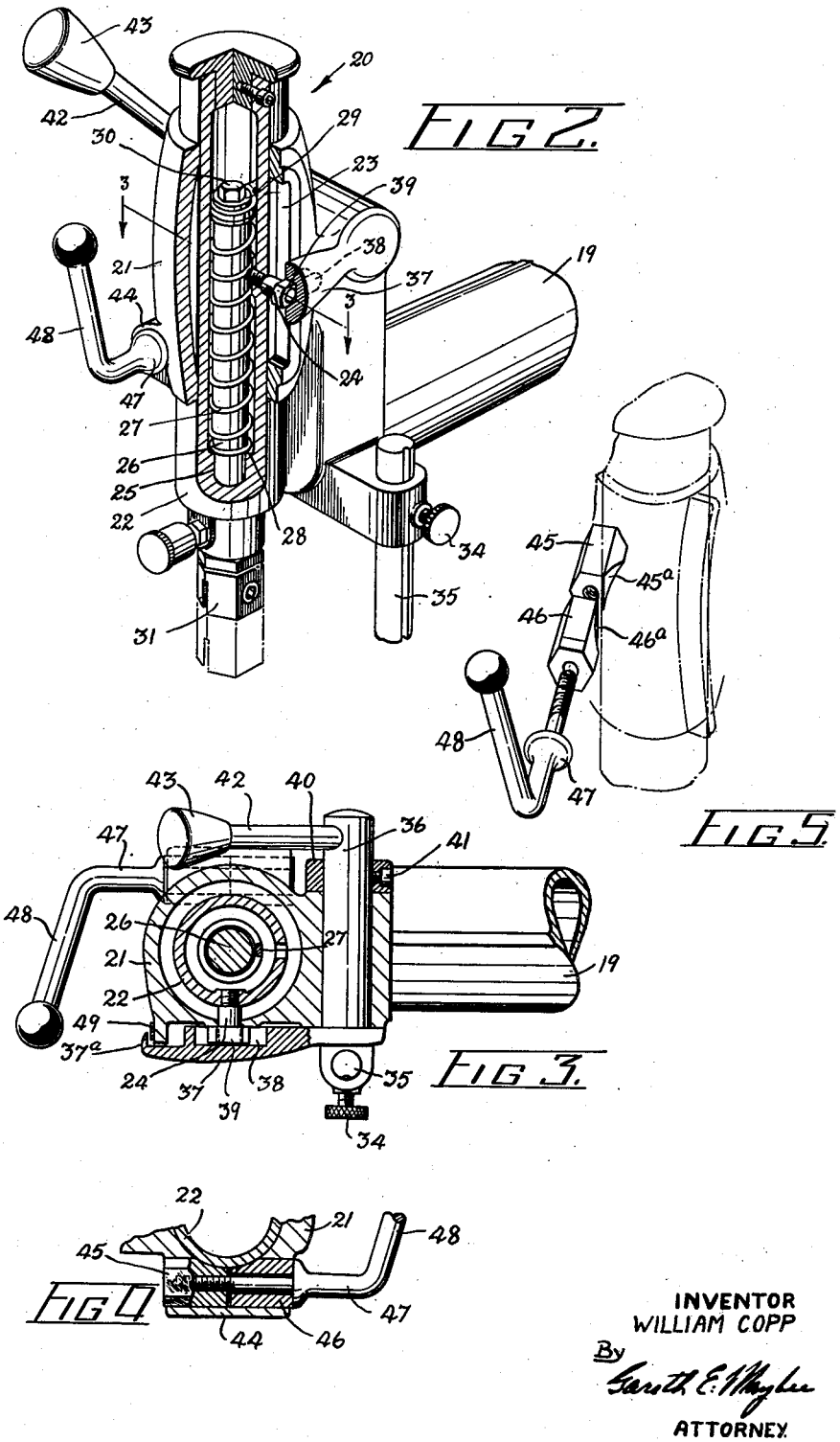

Nov. 11, 1952  W. COPP  2,617,453
JIG SAW

Filed May 19, 1949  3 Sheets-Sheet 3

INVENTOR
WILLIAM COPP
By
ATTORNEY.

Patented Nov. 11, 1952

2,617,453

UNITED STATES PATENT OFFICE 2,617,453

JIG SAW

William Copp, Guelph, Ontario, Canada, assignor to The Callander Foundry & Manufacturing Company Limited, Guelph, Ontario, Canada, a corporation of Ontario Application May 19, 1949, Serial No. 94,086

2 Claims. (Cl. 143—73)

1

This invention relates to improvements in jig saws, and has for its general object to increase the operating efficiency of such machines while its principal particular object is to provide in a jig saw novel means for varying the tension in the saw blade while the machine is in operation.

Jig saws which are so constructed that the blade tension may conveniently be varied during operation are known in the art, and reference is made to W. S. Ocenasek Patent No. 2,165,002, dated July 4, 1939. In such jig saws the upper saw reciprocating mechanism or head comprises a support which is mounted at the end of the usual overarm, and a quill which is translatably mounted on the bracket. In the quill is reciprocatably mounted the spring pressed saw gripping plunger and the quill is connected to the support by a manually operable hand screw whereby the quill may be translated relative to the bracket.

Known jig saws of the kind described suffer from the disadvantage that to change the tension of the saw blade is a slow and tedious task requiring many turns of the hand screw. Moreover, vibrations in the machine combined with the usual tension in the saw blade may cause the hand screw to turn gradually thereby varying the preset tension. Furthermore when the jig saw is used to do what is known in the trade as "internal work," the blade must be removed from its chuck, passed through the work, and it must then be readjusted to the proper tension; this requires first taking tension off the blade and finally readjusting it to the same tension, and the use of a hand screw for this purpose causes an undesirable waste of time.

According to the present invention, there is provided in a jig saw a lever which connects the quill and the support and which is manually operable to translate the quill relative to the support, and there is also provided a separate clamping device to lock the quill against movement in the support.

All of the foregoing and still further objects and advantages of the invention will become apparent from a study of the following specification, taken in conjunction with the accompanying drawings, wherein like characters of reference designate corresponding parts throughout the several views, and wherein:

Fig. 2 is a broken-away perspective view of the upper saw reciprocating mechanism head of the jig saw shown in Fig. 1;

2

Figure 6:
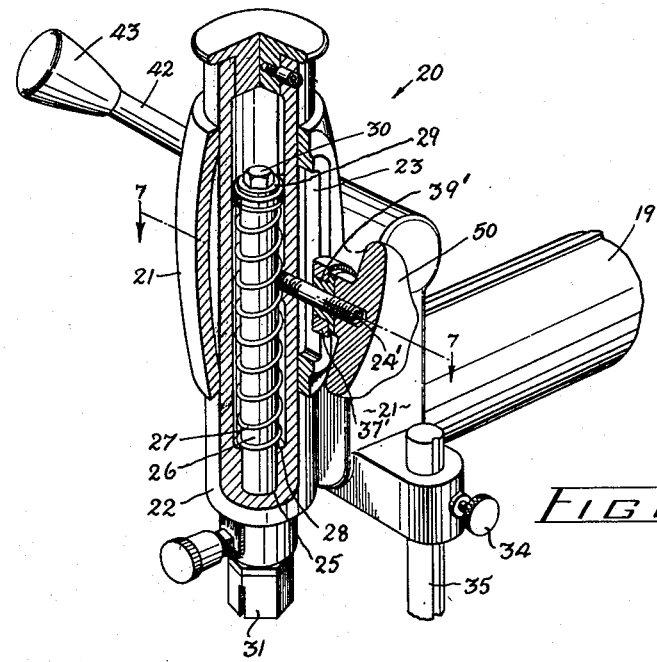
Figure 7:
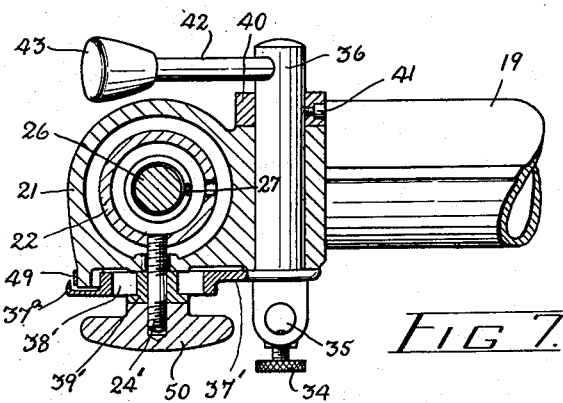

Fig. 3 is a cross-sectional view taken through the line 3—3 of Fig. 2;

Fig. 4 is a fragmentary cross-sectional view of the clamping device provided in the aforementioned head;

Fig. 5 is an exploded perspective view of the aforesaid clamping device and which is shown adjacent a representative portion of the jig saw head drawn in phantom lines;

Fig. 6 is a broken-away perspective view of a modified jig saw head constructed in accordance with this invention; and Fig. 7 is a cross-sectional view taken on the line 7—7 of Fig. 6.

Figure 1:
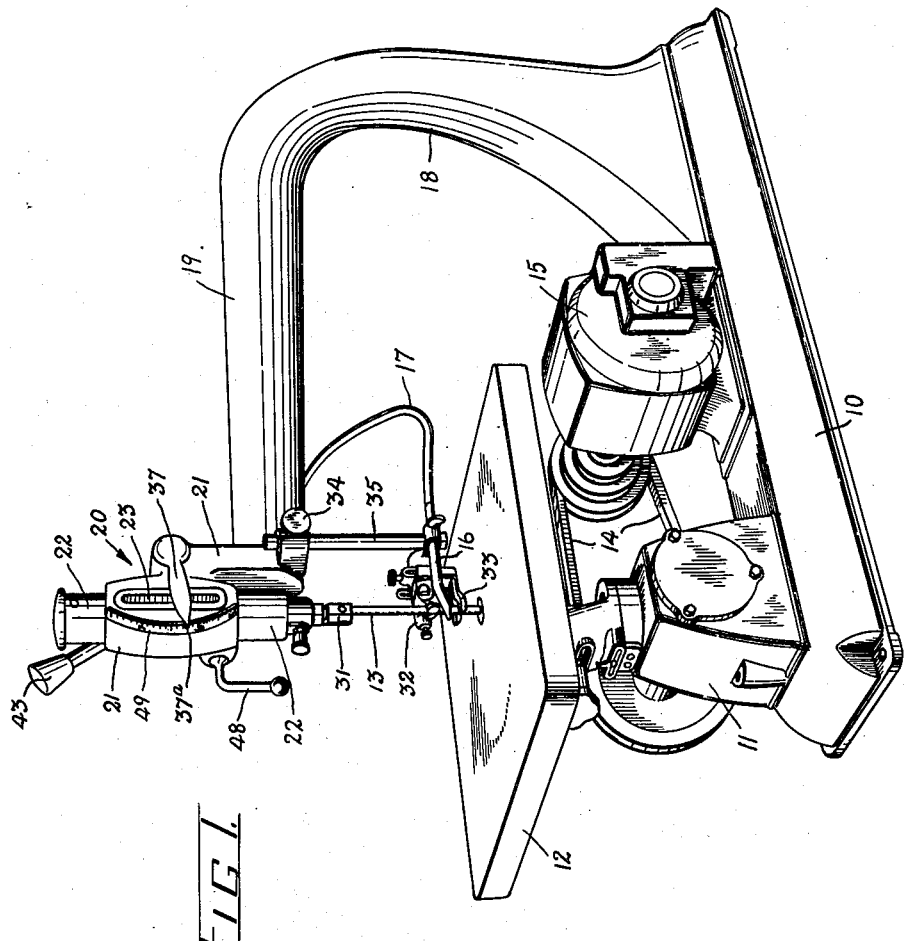
Fig. 1 is a perspective view of a complete jig saw constructed in accordance with this invention.

Referring now particularly to Fig. 1, a jig saw comprises a base 10 at the front of which rises a driving box housing 11 that carries at its upper end a work table 12 which is mounted to tilt about a horizontal axis. In the housing 11 is provided a well known saw reciprocating mechanism to reciprocate the saw 13 which is connected between the said lower saw reciprocating mechanism and the upper saw reciprocating mechanism which will be subsequently described: power is provided thereto by the V-belt pulley transmission 14 connected to an electrical motor 15. In the housing 11 may also be provided a suitable air pump which is connected to nozzle 16 by means of tube 17 so as to blow the sawdust away from the immediate vicinity of the saw and of the cut in the workpiece.

Secured to the rear end of the base 10 is an upstanding pillar 18 which blends with an overarm 19. The upper saw reciprocating mechanism which is generally indicated at 20, is secured to the front end of the overarm.

Referring now to Figs. 2, 3, 4, and 5, the upper saw reciprocating mechanism comprises a hollow casing or support 21 secured to the front end of the overarm 19 and in which is translatably mounted a quill 22. In a wall of the casing and parallel to the axis of the quill is provided an elongated slot 23 through which extends the free end of a pin 24, the other end of the said pin being screwed into the quill.

The quill 22 which is hollow provides a bearing at 25 for the upper saw-gripping plunger 26, around which is coiled a spring 27 the lower end of which bears against a shoulder 28 provided in the quill and the upper end of which is engaged by a washer 29 secured to the upper end of the plunger by the means of a bolt 30. The spring 27 which is in compression is normally operative to maintain the plunger resiliently in retracted position and therefore applies tension to the saw blade. The plunger carries at its lower end a saw gripping chuck 31, which is in registration with the lower saw gripping chuck (not shown), and the blade 13 is secured by and between the chucks. In Fig. 1 there is illustrated a device 32, well known in the art, to guide the saw blade, and also a work presser foot 33. The elevation of the device 32, the presser foot 33 and the nozzle 16 with respect to the work table may be varied by turning screw 34 and moving rod 35 up or down as the case may be.

Through a bearing provided in an enlarged portion at the rear of the support 21 extends a horizontally disposed shaft 36 to one end of which is permanently secured a lever section 37. In the surface of the lever section 37 which is adjacent the casing is provided a longitudinal machined slot 38 in which is slidably mounted a collar 39 which rotatably engages the pin 24.

After the shaft 36 has been assembled in its bearing and the lever section 37 has been properly fitted over the collar 39 in engagement with the pin 24, a ring 40 provided with a set screw 41 is fitted over the free end of the shaft so as to lock it against axial displacement in the casing or support 21. Then another lever section 42 having at its free end a handle 43 is suitably connected radially to the shaft 36.

Lever sections 32, 37 and 42 connected by the shaft 36 together effectively provide a lever, the fulcrum of which is the shaft 36 bearing in the casing 21, the force applying end of which is the handle 43, and the force applied to the said lever being transmitted to the quill 22 by means of collar 39 and pin 24. The operator of the jig saw may thus translate the quill 22 relative to the support 21 by merely shifting the handle 43 in the desired direction.

In another enlarged portion 44 of the casing 21 is broached an hexagonal bore in which are slidably mounted two hexagonally shaped cams or studs 45 and 46. The bore provided in the enlarged portion 44 is so dimensioned and located that it overlaps the main vertical bore in the casing 21 in which is mounted the quill 22, and the studs 45 and 46 are provided with curved chamfers at 45ᵃ and 46ᵃ which are of substantially the same radius as the quill 22. Studs 45 and 46 are bored, threads being tapped in the bore of stud 45, and through the studs extends the shouldered shaft 47 of lock lever 48. The threads on the shaft 47 register with the threads provided in stud 45, and thus as the lock lever is rotated the two studs will be drawn towards each other thereby clamping against the quill at chamfers 45ᵃ and 46ᵃ. This device therefore provides a clamp to lock the quill against movement in the support, after it has been adjusted to the desired elevation by manual shifting of the handle 43.

At the front end of lever section 37 is a pointer 37ᵃ which registers with a scale 49 (see Fig. 1) to indicate the relative degree of tension in the blade. On the scale appear the numerals "5," "6," and "7," and above each numeral are some graduations. The scale is so constructed that the tension on a blade is zero if the pointer is set at the numeral corresponding to the nominal length of the blade in inches; also, the permissible variations of tension in a blade are indicated by the graduations immediately above each one of the numerals.

Figs. 6 and 7 illustrate a modified jig saw head constructed in accordance with this invention. Except as hereinafter described the construction of this modified jig saw head is identical to the construction of the one previously described. Therefore, wherever applicable, Figs. 6 and 7 have been referenced with the same numerals as the other figures.

In the construction disclosed in Figs. 6 and 7, the free end of the pin 24' is threaded, and it extends through the collar 39' and through the machined slot 38' of lever section 37'. A large locking nut 50 is screwed on the free end of the pin 24' and is adapted when tightened to cause frictional engagement between the quill 22, the support 21 and the lever section 37' to thus lock the quill against movement in the support. In this construction, the previously described locking device operated by the lock lever 48 is not required.

It is thought that the construction and use of the invention will be apparent from the above description of the various parts and their purpose. It is to be understood that the form of the invention herewith shown and described, is to be taken as a preferred example of the same, and that various changes in the shape, size and arrangement of parts may be resorted to, without departing from the spirit of the invention or the scope of the subjoined claims.

What I claim as my invention is:

1. In a jig saw of the type in which a saw blade is connected between upper and lower saw reciprocating mechanisms, an upper saw reciprocating mechanism comprising, a support, a quill translatably mounted on said support, a saw gripping plunger reciprocatable in said quill, a pin secured to the quill transversely thereto and having a free end extending through an elongated slot in the support, a spring operating between said plunger and said quill and normally operative to maintain said plunger resiliently in retracted position, a shaft rotatably mounted on the support and extending transversely of the direction of movement of the quill from one side of the support to the other, a lever including a lever section at one side of the support having one end secured to one end of the shaft and its other end slidably and pivotally connected to the free end of the pin and another lever section at the other side of the support having one end secured to the other end of the shaft and its other end providing a handle, the said lever being operable when the handle is shifted to translate the quill relative to its support, and a clamping device which holds the quill firmly against the support to lock the quill against movement in the support.

2. In a jig saw of the type in which a saw blade is connected between upper and lower saw reciprocating mechanisms, an upper saw reciprocating mechanism comprising, a support, a quill translatably mounted on said support, a saw gripping plunger reciprocatable in said quill, a pin secured to the quill transversely thereto and having a free end extending through an elongated slot in the support, a spring operating between said plunger and said quill and normally operative to maintain said plunger resiliently in retracted position, a shaft rotatably mounted on the support and extending transversely of the direction of movement of the quill from one side of the support to the other, a lever including a lever section at one side of the support having one end secured to one end of the shaft and its other end slidably and pivotally connected to the free end of the pin and another lever section at the other side of the support having one end secured to the other end of the shaft and its other end providing a handle, the said lever being operable when the handle is shifted to translate the quill relative to its support, a scale on said one side of the support, the first-mentioned lever section having an indicator registering with the scale, and a clamping device which holds the quill firmly against the support to lock the quill against movement in the support.

WILLIAM COPP.

REFERENCES CITED

The following references are of record in the file of this patent:

UNITED STATES PATENTS

| Number | Name | Date |
|---|---|---|
| 702,217 | Jacobs | June 10, 1902 |
| 874,507 | Highsmith | Dec. 24, 1907 |
| 979,006 | Howland | Dec. 20, 1910 |
| 1,196,656 | Bugbee | Aug. 29, 1916 |
| 1,867,275 | McCarter | July 12, 1932 |
| 1,964,651 | Tautz | June 26, 1934 |
| 2,165,002 | Ocenasek | July 4, 1939 |
| 2,363,115 | Brocklebank | Nov. 21, 1944 |